June 17, 1952 J. BRIÈRE 2,600,471

APPARATUS FOR SOUND RECORDING AND REPRODUCTION ON FILM

Filed May 29, 1948 7 Sheets-Sheet 1

Inventor:
Jean Brière
[signature]

APPARATUS FOR SOUND RECORDING AND REPRODUCTION ON FILM

Filed May 29, 1948 7 Sheets-Sheet 2

Inventor:
Jean Briere

APPARATUS FOR SOUND RECORDING AND REPRODUCTION ON FILM

Filed May 29, 1948 7 Sheets-Sheet 3

Inventor:
Jean Brière
[signature]

June 17, 1952 J. BRIERE 2,600,471

APPARATUS FOR SOUND RECORDING AND REPRODUCTION ON FILM

Filed May 29, 1948 7 Sheets-Sheet 4

Inventor:
Jean Briere
[signature]

June 17, 1952 J. BRIÈRE 2,600,471

APPARATUS FOR SOUND RECORDING AND REPRODUCTION ON FILM

Filed May 29, 1948 7 Sheets-Sheet 5

Inventor
Jean Brière

June 17, 1952 J. BRIERE 2,600,471

APPARATUS FOR SOUND RECORDING AND REPRODUCTION ON FILM

Filed May 29, 1948 7 Sheets-Sheet 6

Inventor
Jean Briere
[signature]

Inventor
Jean Briere

Patented June 17, 1952 2,600,471

UNITED STATES PATENT OFFICE 2,600,471

APPARATUS FOR SOUND RECORDING AND REPRODUCTION ON FILMS

Jean Brière, Vichy, France

Application May 29, 1948, Serial No. 30,064
In France June 20, 1947

5 Claims. (Cl. 179—100.3)

An object of the invention is an apparatus allowing the recording and the reproduction of sound by means of a film.

Apparatus of this kind, for sound recording and reproduction by means of a film are already known to exist. These devices, however, wherein the drive of the film is generally obtained by teeth co-operating with the perforations of said film, have the drawback of requiring a rather difficult setting in position and replacement of the film, while offering, at the same time, all the disadvantages due to the presence of perforations, disadvantages which are particularly apparent in the case of sound recording or reproduction.

If it is desired to avoid the drive by perforations, as has already been proposed, one meets with the difficulty of ensuring a constant speed for the passage of the film in front of the photoelectric system, due to the constant variation of the winding diameter of the film on the coiling spool.

The purpose of the apparatus which is an object of the invention is to obviate these drawbacks. It effects the driving of the film without any perforations on the latter and its passage at a constant speed in front of the optical slit of the scanning system by effecting the film drive by means of a driving drum rotating at a constant speed, the coiling spool, driven by sliding friction having no effect on the unwinding speed.

The driving drum is part of the optical and electrical sound scanning system and the driving mechanism, acts by differential friction. With a view to obtaining the uniform driving of the film by the drum, the latter is combined with a friction wheel which ensures the adherence of the film on the drum during its unwinding.

Since the film is smooth and comprises no perforations, its setting in position is easy and entails no risks of damage and consequently, it allows a simple and economical manufacture. The same film can also conveniently comprise several sound tracks, arranged side by side, which, by increasing the width of the band ensures a better unwinding while avoiding too frequent a replacement of the spool. An additional support can also conveniently be added on the face of the film carrying the emulsion, so as to avoid any wear of the film.

Besides this, the film is made so as to be integral with the spool, which can thus be marked with the titles of the pieces.

The driving mechanism and the electrical system are assembled and contained inside a suitable cabinet, for instance a suitcase with a lid.

The assembly is effected so as to form several secondary assemblies or blocks which are: on one hand the motor unit, the pre-amplifier unit and the energizing and modulating tube unit, which are attached to the cabinet so as to avoid any transmission of vibrations, and, on the other hand, the transmission unit to the pulley relay block, the drum driving unit, the forward drive and rewinding unit and the automatic stoppage unit which are associated with the frame of the apparatus.

The apparatus offers the advantage of making it possible to obtain, at will, a sound recording on a virgin film, the energizing and modulating tube unit being, to this effect, mounted slidingly on a chassis attached to the cabinet so as to make it possible, by a simple shifting of said block to pass from recording to reproducing and vice versa.

The invention also includes various detail improvements for ensuring a good operation of the apparatus, which will be described more in detail in the present specification.

The appended drawings show, by way of example, a type of embodiment of the apparatus which is in object of the invention which is mounted, here, inside a case with a lid for its transportation.

Figure 1 of these drawings is a perspective view of the whole apparatus.

Figure 2:
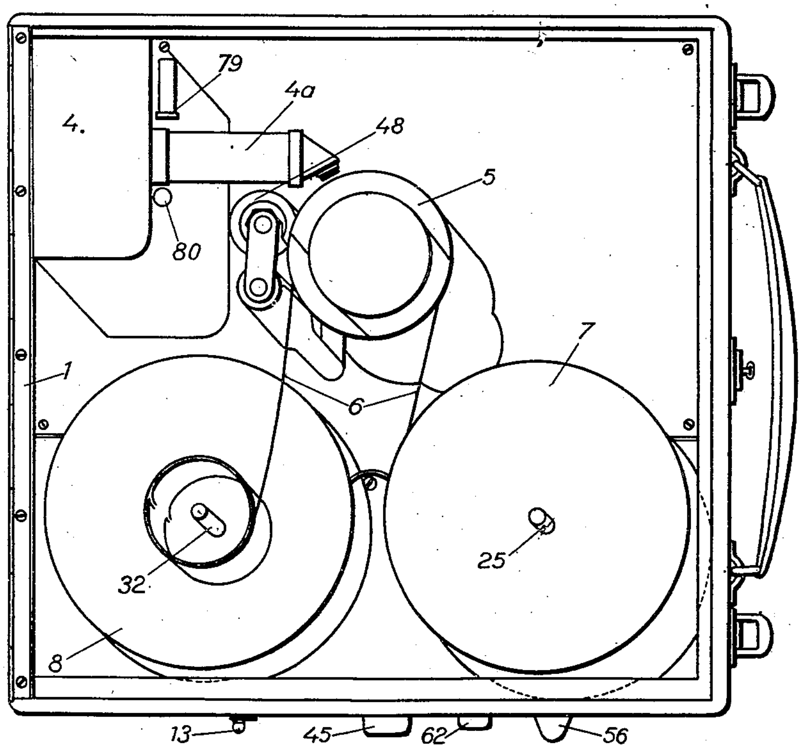
Figure 2 is a plan view thereof, the lid of the case being removed.
Figure 1:
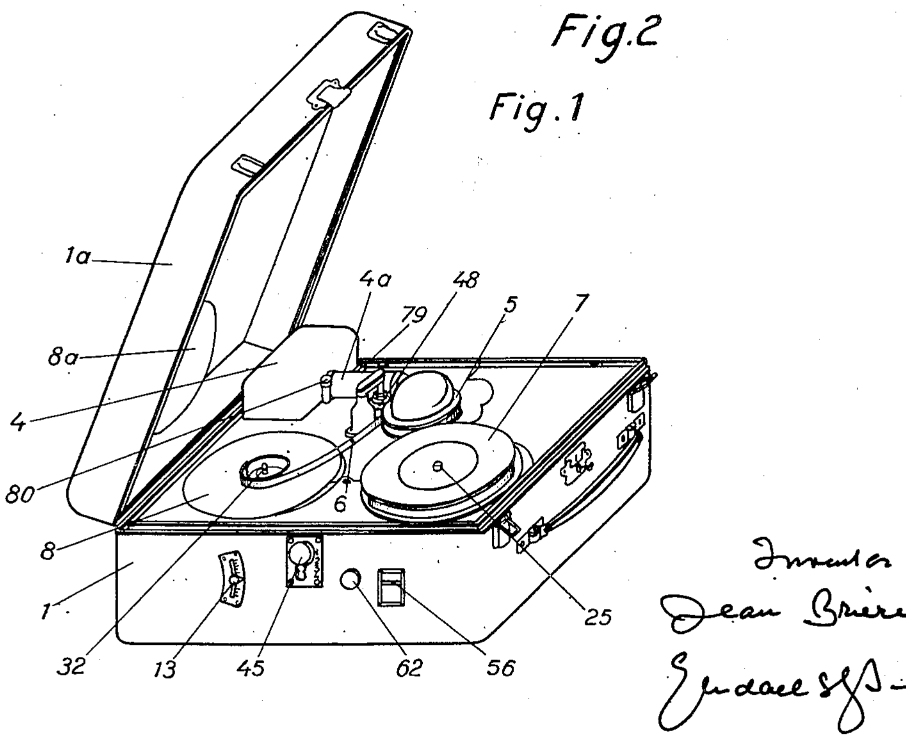
Figure 3:
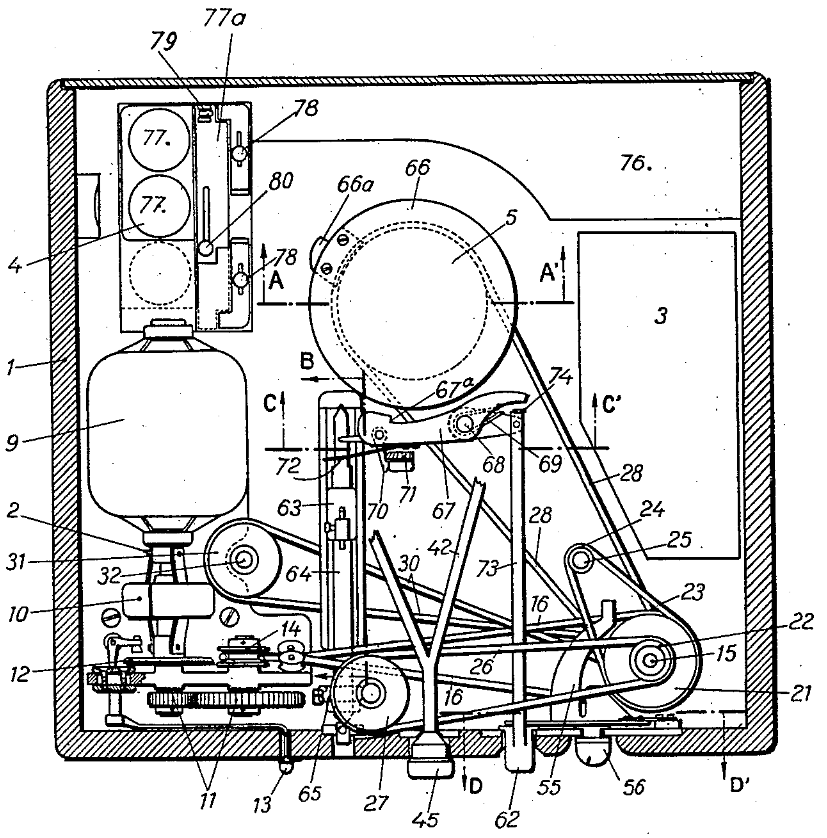
Figure 3 is a general plan view of the whole inside mechanism.

As can be seen in the drawings, and more particularly on Figures 1, 2 and 3, in a cabinet 1 which, here, has the shape of a suit case, are grouped the motor unit 2, the pre-amplifier 3 and the block of the energizing and modulating tubes 4 which are suitably attached thereto by an anti-vibration mounting, so as to avoid any transmission of vibrations; Figures 1 and 2 also show the optical tube 4ª starting from the block 4 of energizing and modulating tubes and the driving drum 5 whereon passes the film 6, unwinding from the load spool 7 to be wound again on the coiling spool 8.

The driving mechanism for the film consists of an electric motor 9, combined with a speed governor 10, connected to the reduction gears 11 through a servo-motor 12, of the friction type, for instance, making it possible to vary the speed by operating a button 13 accessible from outside the cabinet 1. The reduction gears 11 control the main driving pulley 14 driving the transmission block through belts.

The whole assembly constitute the motor unit.

Figure 4:
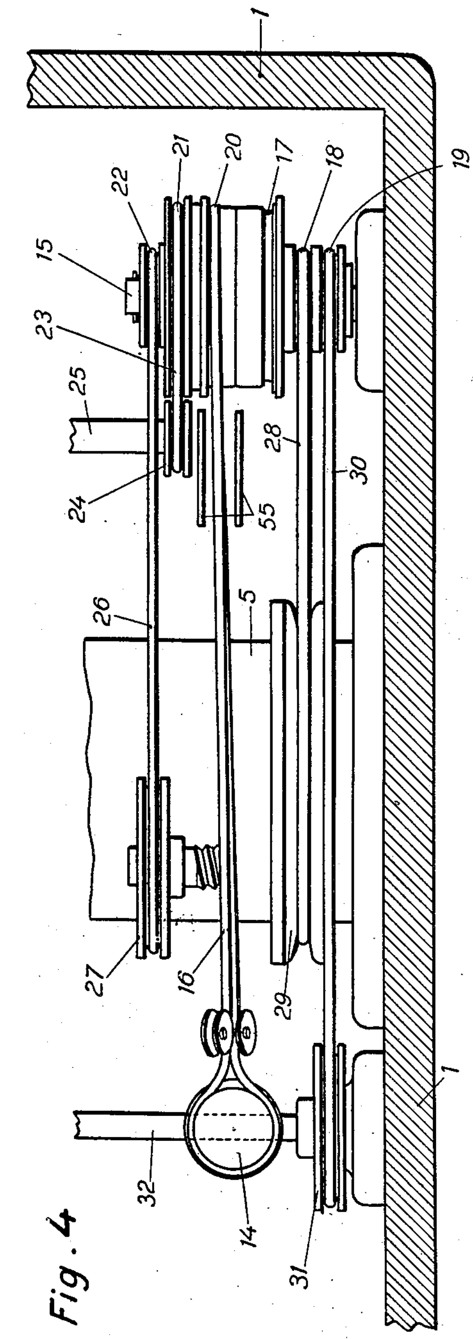
Figure 4 is a side view showing the detail of the transmission block.

The transmission unit or pulley-relay unit (see Figures 3 and 4) comprises a group of two pulleys with multiple gorges mounted side by side on a common axle 15 and controlled by the main pulley 14 by means of a belt 16. The belt used will preferably consist of a helical spring of metal wire (as all the other belts in the apparatus). The lower pulley comprises three gorges 17—18—19 and the upper pulley comprises three gorges 20—21—22.

The belt 16 drives either the upper pulley, when it is in gorge 20 or the lower pulley when it is in gorge 17. The upper pulley drives, on one hand, through gorge 21 and belt 23 the pulley 24 which controls the axle 25 of the load spool 7 and, on the other hand, through gorge 22 and belt 26, the pulley 27 which controls the automatic stoppage block which will be described later. The lower pulley drives, on one hand, through gorge 18 and belt 28 the pulley 29 which controls the driving drum 5 for the film, and, on the other hand, through gorge 19 and belt 30, the pulley 31 which controls the axle 32 of the coiling spool 8.

It will thus be apparent that by passing the belt 16 either on gorge 17 or gorge 20, there will be driven, respectively, either the coiling spool 8 for unwinding the film or the load spool 7 for the re-winding, the windings on these two spools 8 and 7 being effected in opposite directions, since belt 23 is a direct belt while belt 30 is a crossed belt.

The film driving drum 5 (see Figure 5) is firmly attached through its base 33ª of its hollow axle 33 on the lower wall of cabinet 1, this axle housing, at its center, the photo-electric cell 34 as well as the cylindrical lens. The drum proper consists of a cylindrical sheath 35 to which is attached the control pulley 29, driven by the belt 28; the lower portion 36 of this sheath, whereon the film passes, is of a transparent material, such as Plexiglas. The sheath 35—36 is covered with a protection lid 37. Around the sheath 35 is arranged a correcting or regulating flywheel 38 whose purpose is to increase the inertia.

Figures 7, 7A:
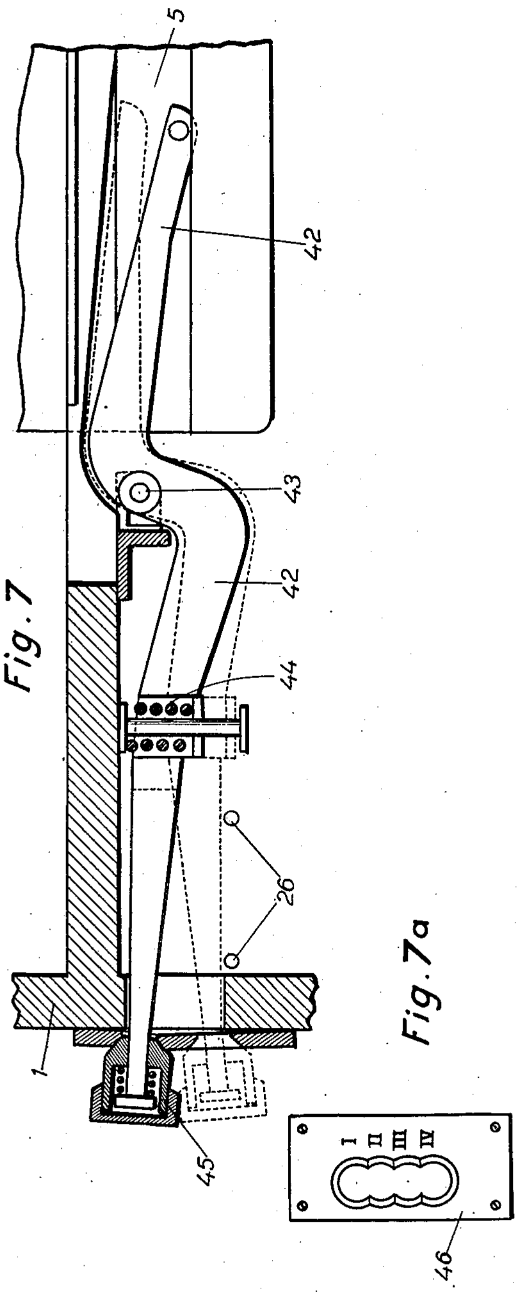
Figure 7 is a side view of the supporting fork for the framing, acting in combination with the drum.
Figure 7*a* is an end view of the retaining plate of this fork.

On this flywheel is applied a friction disc 39 suitably pressed against the flywheel by a spring 40 and associated with a stop damping disc 66 (see Figure 3) provided with a retaining catch 66ª. The flywheel comprises, inside, a crown 41 whereon may act the end of fork 42 (see Figure 7) articulated at a fixed point 43, so as to allow the drum to be imparted a vertical translation motion; a compensating spring 44 ensures the return motion of the fork. The outer end of the fork which comes outside of cabinet 1 carries a spring plug 45, capable of engaging the successive notches (I, II, III, IV . . .) of a small plate 46 attached on the outer wall of the cabinet (see Figure 7*a*) these notches corresponding to the different sound tracks of the film.

Figures 5, 6:
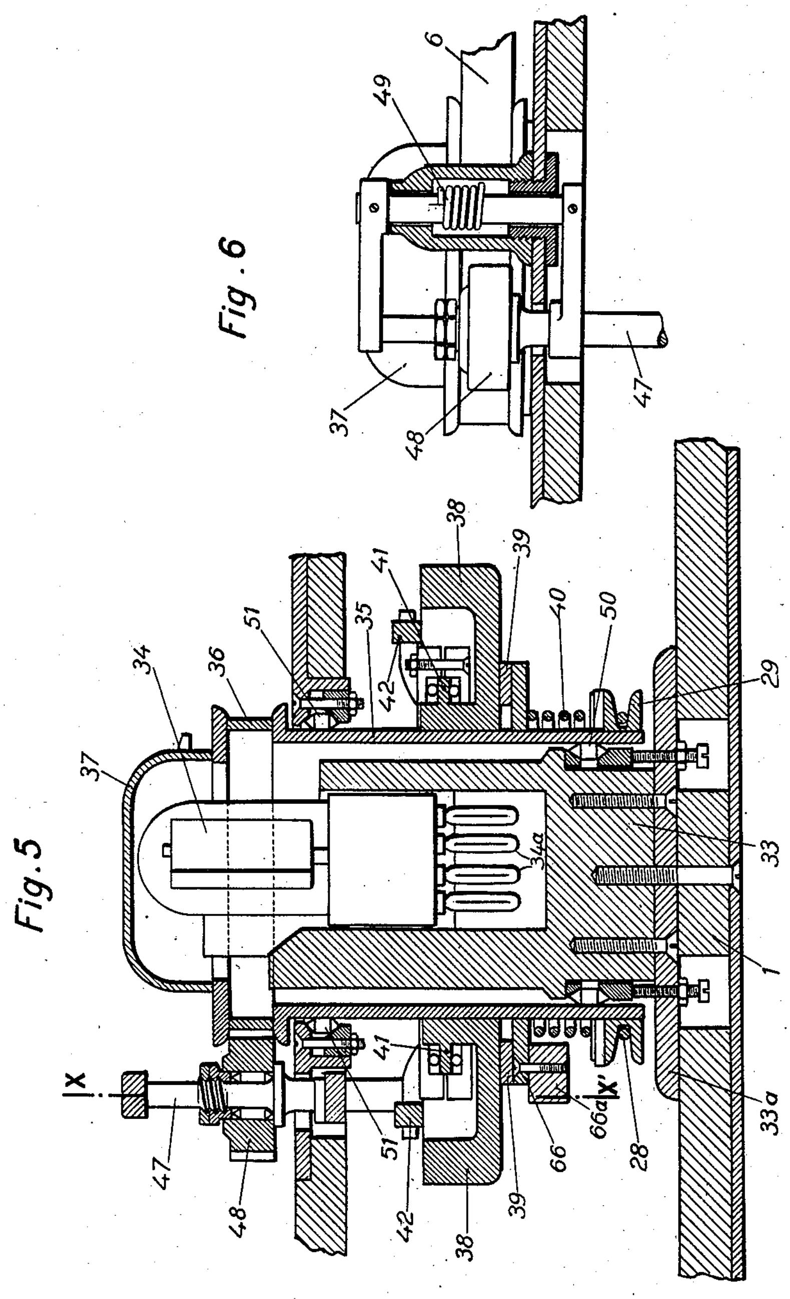
Figure 5 is a view in vertical section of the driving drum, taken along line A—A' of Figure 3.
Figure 6 is a transverse section through the axis of the wheel of adherence on the drum, along line X—X' of Figure 5.

On fork 42 bears the axle 47 of an adherence wheel 48 lined, on its periphery, with a rubber coating and which a spring 49 tends to press against the film 6 passing over the drum (see Figure 6).

The driving drum 5 rotates about its axis through an inner ball bearing 50, arranged at its lower part, and an outer ball bearing 51 arranged at its upper part. This arrangement makes possible the translation motion of the drum, necessary for the framing of the sound tracks opposite the optical slit of the photo-electric system.

Figures 12, 13:
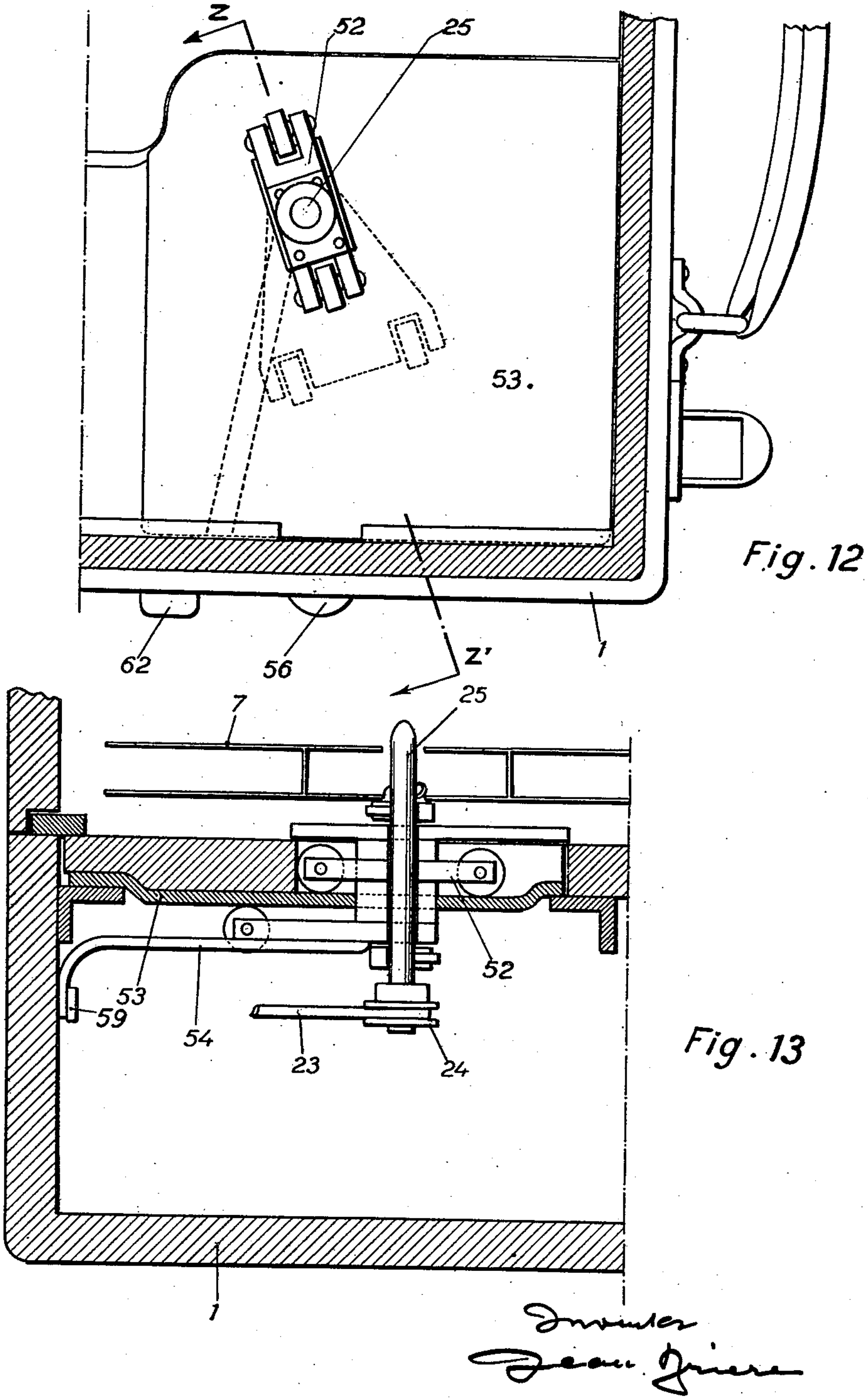
Figure 12 is a plan view of the support for the axle of the load spool.
Figure 13 is a section thereof along line Z—Z' of Figure 12.

The axis 25 of the load spool 7, which is controlled by pulley 24 (see Figures 12 and 13) is not associated with the cabinet 1 of the apparatus; it is supported on the latter by a carriage 52 connected to the re-winding system by a rod 54. Since the film is associated with the load spool, the result is that when the film is completely unwound, the rest of the mechanism being still in operation, the film exerts a pull on the carriage which then acts on the automatic system by means of the rod 54.

Figures 8, 9, 10, 11:
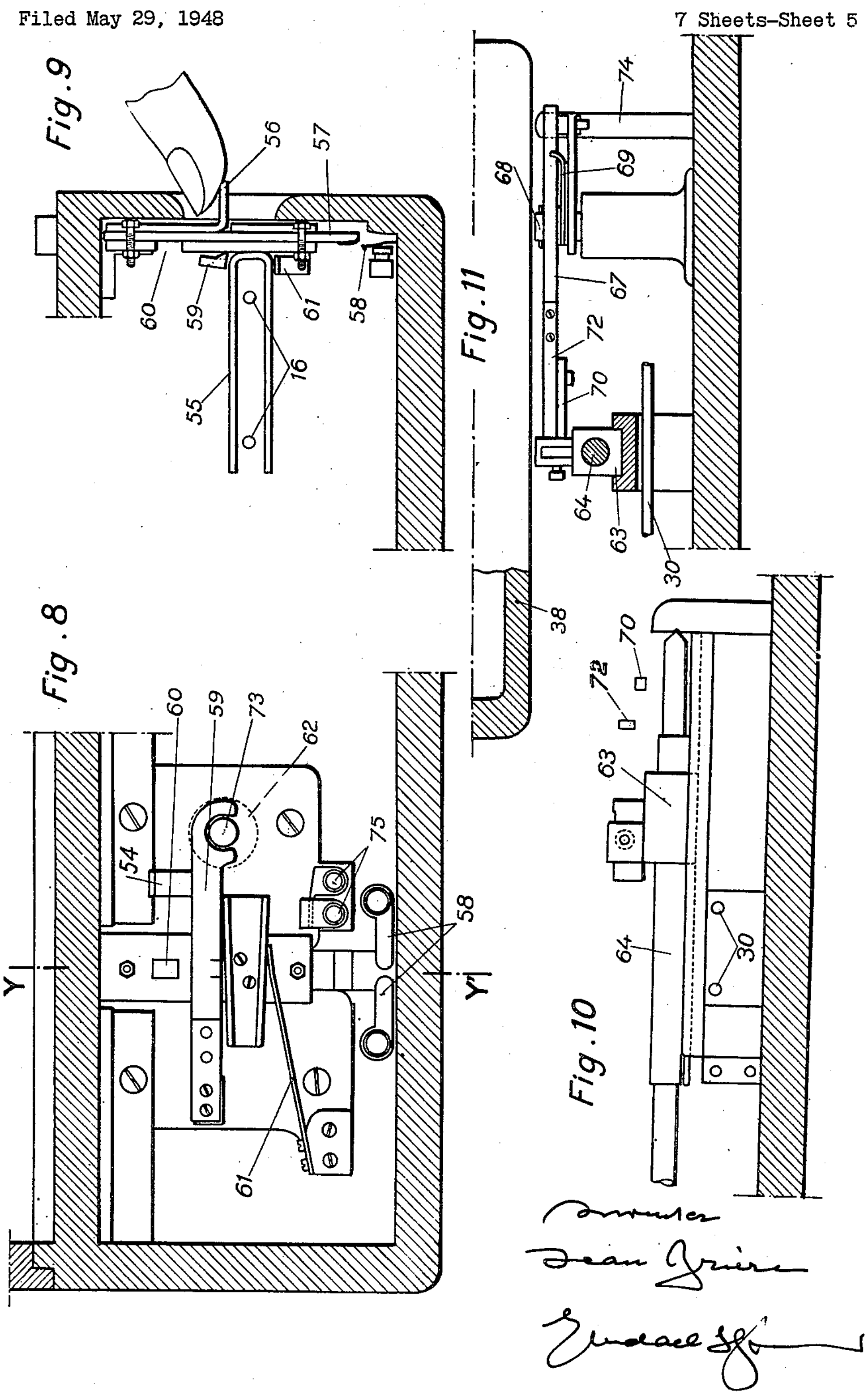
Figure 8 is an inner side view of the starting mechanism viewed along line D—D' of Figure 3.
Figure 9 is a transverse section thereof along line X—Y' of Figure 8.
Figures 10 and 11 are two side views of the automatic stoppage block viewed respectively along lines B—B' and C—C' of Figure 3.

A clutch fork 55 (see Figures 4 and 9) guides the driving belt 16 to make it pass from gorge 20 of the upper pulley 20—21—22 to gorge 17 of the lower pulley 17—18—19 and vice versa.

The control button 56 of this fork, which protrudes outside the cabinet, is associated with an insulating plate 57 which, during the displacement of the button establishes the contact 58 of the pre-amplifier 3. A pawl 59, engaging an ingear window 60 during the motion of this button 56, holds this button in its position.

A return spring 61 brings back all the sliding plates to their initial positions when the rod 54 attached to the carriage and turning back behind the pawl 59 (Figure 13) is driven by the slight pull of the unwound film, the latter being associated with the load spool.

A re-winding button 62 protruding from the outer wall of the cabinet, allows the same effect under the action of spring 61 by triggering pawl 59.

This motion, at the same time, causes the displacement of the clutch fork 55 which passes the driving belt 16 from the lower to the upper pulley. The re-winding of the film can thus be effected.

The automatic stop system (see Figures 3, 10 and 11) consists of a slide 63 guided by an endless screw 64 whose rotation is controlled by the axle of pulley 27, gearing with a helical wheel 65, associated with the endless screw 64. The slide 63, at one end of its stroke, corresponding to the completion of the re-winding, compresses spring 72 then acts on a trigger 70 which breaks the electrical contact previously established at 71 and which releases the pawl 67 articulated at 68. The triggering of pawl 67 causes the stopping of the driving drum 5 the catch 66ª carried by the stop damping disc 66 of flywheel 38 of the drum being then hooked by a notch 67ª provided on the opposite face of the pawl.

This arrangement allows the stopping before the film is completely disengaged from the coiling spool 8 so that there is no need for resetting the film in position if it is desired to pass the other sound tracks of the same film.

If it is desired to obtain the complete winding up of the film; it is only necessary to depress the re-winding button 62 which, by means of a rod 73 establishes a contact 74 and which, acting on pawl 67, releases the locking notch 67ª.

The three contactors 75, 71 and 74 are connected in parallel on the circuit of motor 9, contactor 75 being the starting contactor, contactor 71 being the stopping circuit-breaker after re-winding, and contactor 74 the contactor for finishing the re-winding, contactor 75 corresponding to the starting button 56 and contactor 74 to the re-winding button 62.

The automatic stop system, when correctly set, must act a little before the end of the complete re-winding of the spool. To complete this re-winding, if deemed necessary, a pressure is exerted, as has already been mentioned, on the re-winding button 62. It happens frequently, however, that there is a risk of acting too long on this button, so that the slide continues its motion too far and thus, upon the next starting, acts too soon.

To obviate this drawback, the thread of screw 64 ends much before the end of its shaft which is smooth and is extended without any screw-thread, so that said shaft rotates inside the slide, without carrying it beyond the limiting position predetermined. The return spring 72 acting on the slide 63 will allow the latter to engage the screwthread as soon as the circuit is closed, and when the slide has moved away sufficiently from drum 5, the spring 69 of pawl 67 will restore catch 70 to its stop notch, establishing contact 71.

The energizing and modulating tube unit 4 (see Figure 3) comprises two tubes 77, mounted side by side on a common base 77ª which can slide on a chassis attached to the bottom of cabinet 1. Two sliding shims associated with said base comprise screws 78 capable of moving along slides and allowing the fixation in position of the tube unit after adjustment. The purpose of these shims is to limit the displacement of the unit on its chassis, so that each of the tubes 77 may come exactly on the axis of the optical tube 4ª. A handle 79 (see Figure 2) allows the displacement of the unit and a thumb nut 80 ensures its fixation at the adjustment position.

Figures 14, 15:
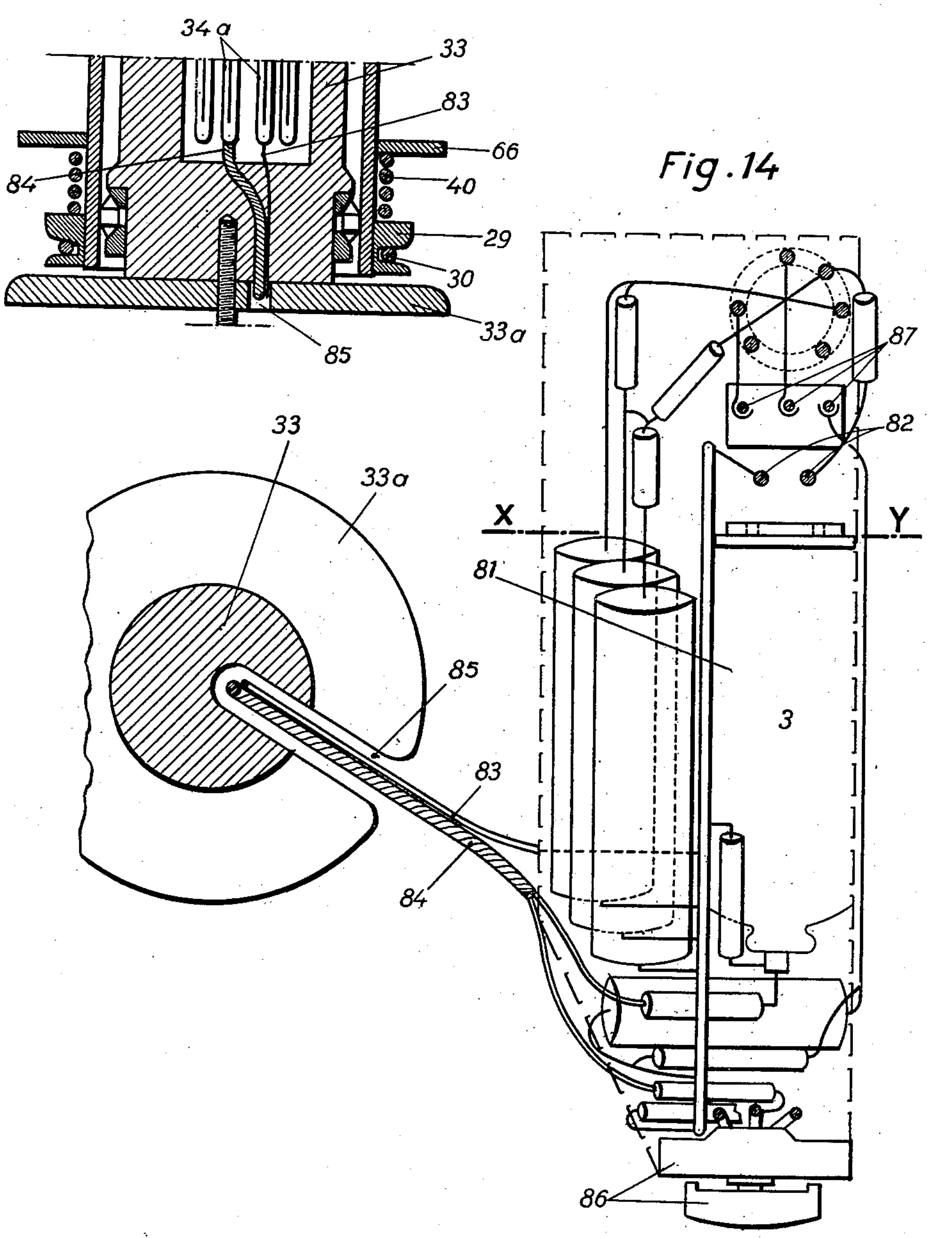
Figure 14 is a schematic view of the pre-amplifier, the portion located above line X—Y being, for greater simplicity of the representation, a folding back at 90° of the panel supporting the tube.
Figure 15 is a part section of the lower part of the photo-electric cell, showing its connection with the pre-amplifier.

The pre-amplifier (see Figures 14 and 15) comprises neither a transformer nor a rectifier tube, its supply is obtained directly from the radio receiving set, without any danger to said set, the anode current of the pre-amplifier being only a few milliamperes. It comprises a pentode 81 and the two output leads 82 are connected directly to the reproducer terminals of the set. The three supply leads 87 (one for the high voltage device and the two others for heating) are connected to the terminals of a multi-terminal socket which is placed under an amplifier tube of the set. The connections are shown on Figure 14 whose upper portion, above line X—Y is a folding over of the panel holding the tube.

The various connecting leads of the apparatus with the radio-receiving set may be grouped inside a box 76 suitably arranged inside the cabinet.

The modulated current, from the photo-electric cell, is brought from the latter to the pentode by two wires 83 and 84 from two terminals 34ª of the photo-electric cell, one of which, the anode wire 84 must be carefully screened. These wires come out of the axis 33 of the cell and go through a notch 85, provided in its fixation base 33ª. A potentiometer 86, combined with the pentode 81 allows the adjustment, once for all, of the cell voltage.

The operation of the apparatus thus designed is as follows:

The film being wound on the load spool 7 is hooked on the coiling spool 8 after being passed over the drum 5 and the slide 63 being, at the end of its run, at the initial starting position (at the upper end of screw 64 on Figure 3) the depression on the starting button 56 causes the driving belt 16 to pass on the lower pulley (gorge 17) closes the contact 58 of the pre-amplifier and also closes the starting contact 75, causing the starting of the motor which unwinds the film 6 and its winding onto the coiling spool 8.

The film, driven by the drum 5 against which it is pressed by the adherence wheel 48 thus passes in front of the optical slit of the photo-electric system and, at the same time, it is wound on spool 8.

When the film has unwound sufficiently, a contact is established at 71, with a view to relaying the contact 75 which is broken, at the time of rewinding, by the rod 54.

The automatic stopping of the re-winding of the film then is caused by the stop of slide 63 against pawl 67 which, in turn, breaks contact 71, by stopping the motor, and also by causing, by notches 66ª and 67ª, the stopping of drum 5, the disc 39 acting as a brake.

During the listening-in, if an occasional re-winding is desired, the re-winding of the film on the coiling spool 7 is effected by depressing the re-winding button 62, which causes the displacement of fork 55 which passes the driving belt 16 on the upper pulley (gorge 20 breaks the contacts 58 of the pre-amplifier end 75 of the motor, thus letting contact 71 act on the motor. (Contact 74 plays the same part in case 71 is not closed, due to the insufficient displacement of slide 63); in any case, this action brings back slide 63ª towards the spring 72 of pawl 67.

The re-winding button 62 also allows the finishing of the re-winding, in case it is desired to complete the winding up until the end of the band with a view to changing the spool.

For the load spool, there is provided, at the end of the film, a flared portion, obtained either directly on the film or by means of an added part, this flared portion being wedged between the two flanges of the spool. Once the load spool has been wound, the film cannot unwind, which avoids the use of a rubber band or a holding piece of cardboard.

The upper face 8ª of the winding spool 8 will preferably be independent of the body of said spool, and carried by the lid 1ª of the cabinet, so that the lowering of the lid closes and completes the spool. This arrangement makes it possible to set in position and to attach more easily the end of the film on the coiling spool. The starting will take place after the lowering of the lid.

In order to avoid any wear of the film emulsion, there will be provided, preferably, a second support glued on to the emulsion, after development, the emulsion being thus protected the film will be practically incapable of wear.

The apparatus can also be used for sound recording on a virgin film. It will only be necessary to bring the modulating tube opposite the slot of the optical system, the other tube being the energizer used for reproduction, which is easily obtained by a displacement of the energizing and modulating tube unit by loosening the thumb nut 80 and acting on rod 79, then tightening again this thumb nut. To establish a correspondence between these connections, the wires of the modulating tube are connected to the terminals of the additional loud speaker of the radio set; once the adjustment has been effected, the user will only need to act on the potentiometer of the set.

The dimensions and nature of the film are the same as those used for common films. With a usual film of the 9.5 millimeters size, for instance, four sound tracks can easily be obtained, side by side, each having a width of 2 millimeters and the widths of the tracks can even be reduced to 1.5 millimeters which makes it possible to place five or even six sound tracks on one band. By decreasing the modulation of the image in concentration (for instance to two-thirds) a substantial increase could also be obtained of the length of audition of each track, which would increase considerably the total length of time of audition for one spool.

It will be understood that the film drive being caused by the sole action of drum 5 combined with the adherence wheel 48, the passage speed of this film in front of the optical slit of the sound scanning system is perfectly constant; the adherence effect of the wheel 48, to this effect, is suitably calculated to be always larger than the braking action, either of the load spool for the unwinding of the film, or of the coiling spool for the re-winding.

The coating of rubber or other material having a high frictional coefficient, of the adherence wheel, avoids any mechanical complication.

Further, the films used being smooth and without any perforations offer absolutely no weak spots and are not liable to tear. There is thus obtained a saving in material and a simplification of the manufacture of the manufacture of the film and, at the same time, the dimensions are reduced owing to the suppression of the side tracks for the perforations.

The use of a plurality of sound tracks on one film makes it possible to avoid too frequent a replacement of the spools and to obtain, with one band, a long total duration of audition, which is especially advantageous when the spool includes four or five parts of one program.

Finally, the use of a double support for the film may make said film practically free of wear.

It is obvious that the details of embodiment which have been described and represented have been given only, by way of non limitative examples of the invention and that said invention is capable of any number of modifications.

What I claim is:

1. An apparatus for the recording and reproduction of sound by means of a film carrying a plurality of sound tracks, having a rotatable drum provided with a transparent slot and an electro-optical system arranged inside the drum opposite the slot, comprising in combination: a stationary hollow carrier for receiving the lower part of the scanning system; a cylindrical sheath rotatably arranged with respect to said carrier and surrounding same, said sheath serving as rotatable drum for the film; and a fork having a stationary pivot and having its fore end connected to said sheath so as to impart to said sheath axial displacements with respect to said carrier so as to expose any of the sound tracks of the film to the scanning system.

2. An apparatus for the recording and reproduction of sound by means of a film carrying a plurality of sound tracks, having a rotatable drum provided with a transparent slot and an electro-optical scanning system arranged inside the drum opposite the slot, comprising in combination: a stationary hollow carrier for receiving the lower part of the scanning system; a cylindrical sheath rotatably arranged with respect to said carrier and surrounding same, said sheath serving as rotatable drum for the film; a wheel arranged outside and in contact with the transparent slot so as to positively pass the film at a constant speed along the transparent slot; and a fork having a stationary pivot and having its fore end connected to said sheath so as to impart to said sheath axial displacements with respect to said carrier so as to expose any of the sound tracks of the film to the scanning system.

3. An apparatus for the recording and reproduction of sound by means of a film carrying a plurality of sound tracks, having a rotatable drum provided with a transparent slot and an electro-optical scanning system arranged inside the drum opposite the slot, comprising in combination: a stationary hollow carrier for receiving the lower part of the scanning system; a cylindrical sheath rotatably arranged with respect to said carrier and surrounding same, said sheath serving as rotatable drum for the film; a spring loaded wheel arranged outside and in contact with the transparent slot so as to positively pass the film at a constant speed along the transparent slot; and a spring loaded fork having a stationary pivot and having its fore end connected to said sheath so as to impart to said sheath axial displacements with respect to said carrier so as to expose any of the sound tracks of the film to the scanning system.

4. An apparatus for the recording and reproduction of sound by means of an unperforated film carrying a plurality of sound tracks, having a rotatable drum provided with a transparent slot and an electro-optical scanning system arranged inside the drum opposite to the slot, comprising in combination, a stationary hollow carrier for receiving the lower part of the scanning system; a cylindrical sheath rotatably arranged with respect to said carrier and surrounding same, said sheath serving as rotatable drum for the film; a spring loaded adherence wheel arranged outside and in contact with the transparent slot, said adherence wheel pressing the film against said slot so as to positively pass the film at a constant speed along the transparent slot; a coiling spool; means for rotating said coiling spool by sliding friction so that said coiling spool has no effect on the unwinding speed of the film; and a spring loaded fork having a stationary pivot and having its fore end connected to said sheath so as to impart to said sheath axial displacements with respect to said carrier so as to expose any of the sound tracks of the film to the scanning system.

5. An apparatus for the recording and reproduction of sound by means of an unperforated film carrying a plurality of sound tracks, having a rotatable drum provided with a transparent slot and an electro-optical scanning system arranged inside the drum opposite to the slot, comprising in combination, a stationary hollow carrier for receiving the lower part of the scanning system; a cylindrical sheath rotatably arranged with respect to said carrier and surrounding same, said sheath serving as rotatable drum for the film; a spring loaded adherence wheel arranged outside and in contact with the transparent slot, said adherence wheel pressing the film against said slot so as to positively pass the film at a constant speed along the transparent slot; a load spool being integral with the film, said load spool being marked with the titles of the pieces recorded on the film; means for rotating said load spool by sliding friction so that said load spool has no effect on the unwinding speed of the film; and a spring loaded fork having a stationary pivot and having its fore end connected to said sheath so as to impart to said sheath axial displacements with respect to said carrier so as to expose any of the sound tracks of the film to the scanning system.

JEAN BRIÈRE.

REFERENCES CITED

The following references are of record in the file of this patent:

UNITED STATES PATENTS

| Number | Name | Date |
|---|---|---|
| 1,614,214 | Steiner | Jan. 11, 1927 |
| 1,786,301 | Heisler | Dec. 23, 1930 |
| 1,822,727 | Del Valle | Sept. 8, 1931 |
| 2,096,445 | Begun | Oct. 19, 1937 |
| 2,111,807 | Ross et al. | Mar. 22, 1938 |